C. C. SPENGLER & H. T. SIDWAY.
HEATING APPLIANCE.
APPLICATION FILED NOV. 23, 1908.
956,742.
Patented May 3, 1910.
2 SHEETS—SHEET 1.
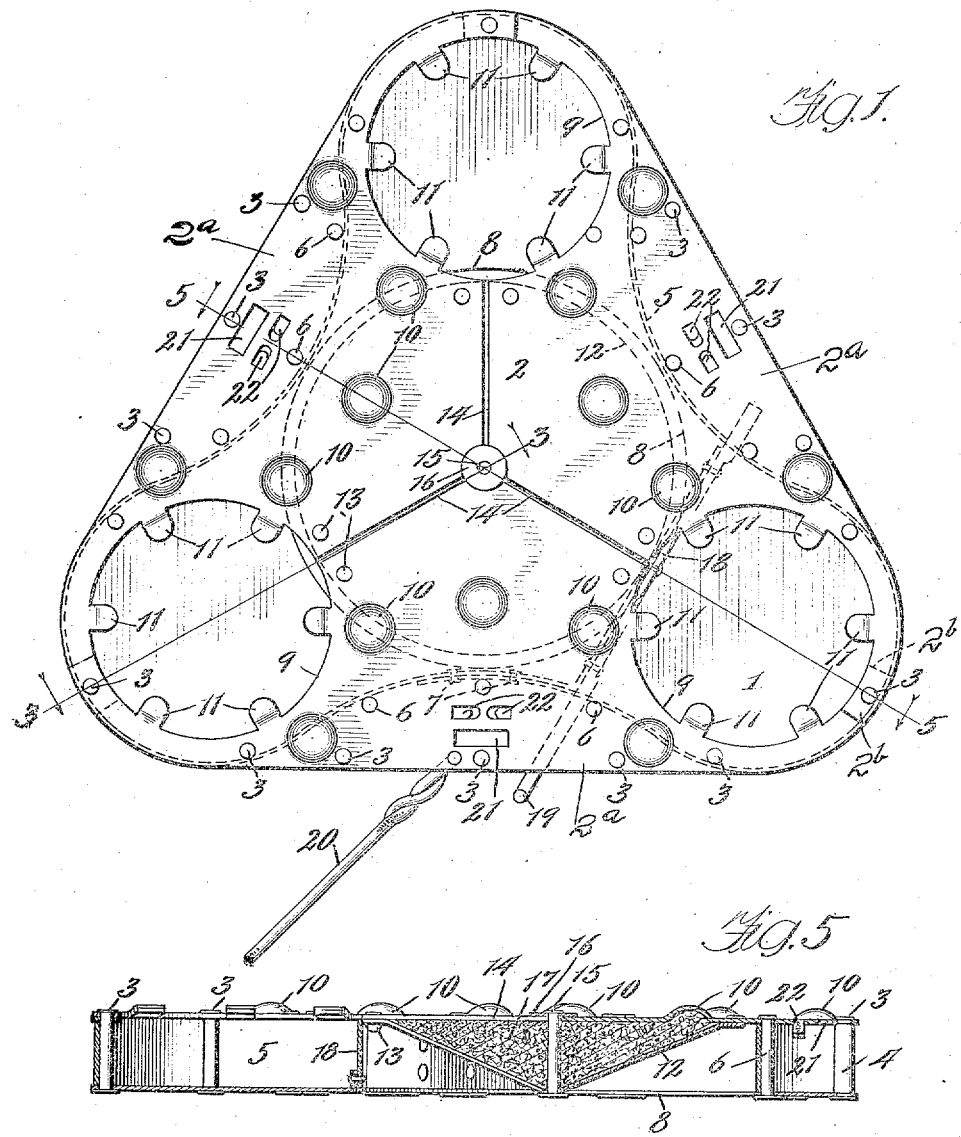
Witnesses:
Robert H. Weir
Arthur W. Carlson
Inventors.
Charles C. Spengler
Henry T. Sidway
By Luther L. Miller
Atty C. C. SPENGLER & H. T. SIDWAY.
HEATING APPLIANCE.
APPLICATION FILED NOV. 23, 1908.
956,742.
Patented May 3, 1910.
2 SHEETS—SHEET 2.
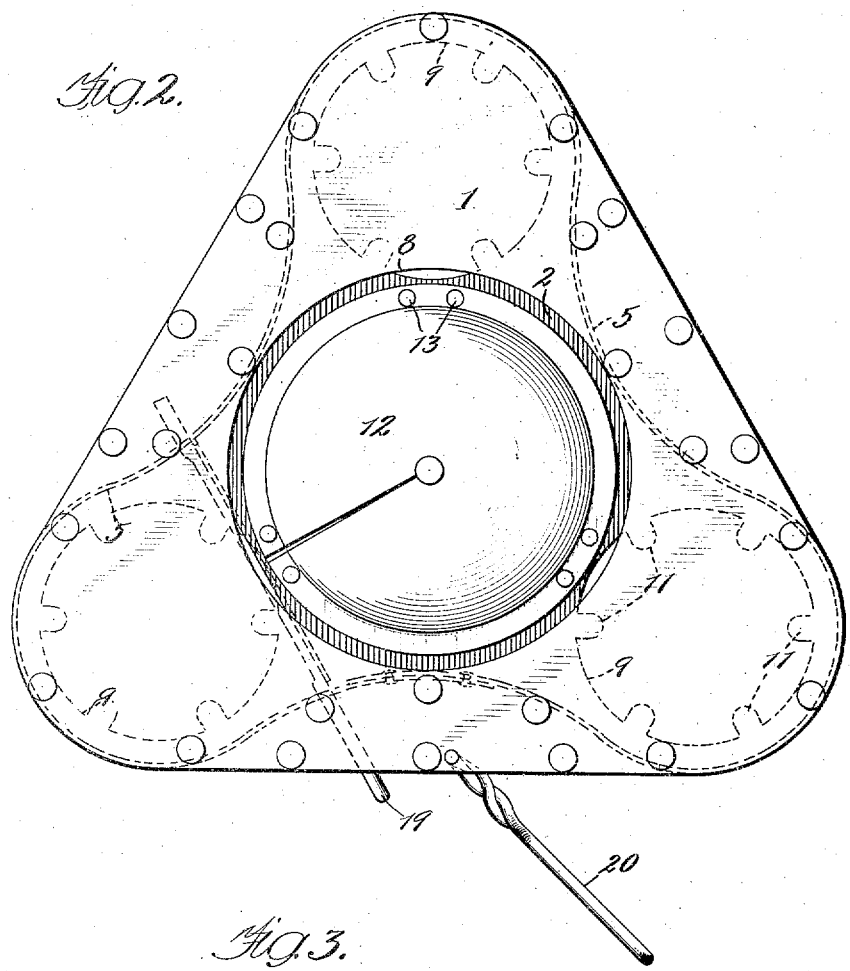
Witnesses:
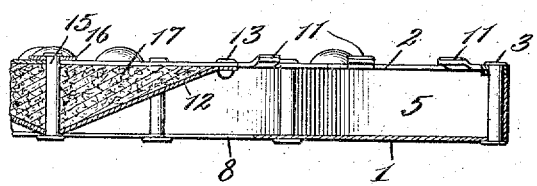
Inventors:
Charles C. Spengler
Henry T. Sidway
By Luther L. Miller
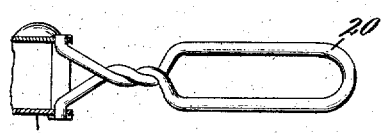

UNITED STATES PATENT OFFICE.

CHARLES C. SPENGLER, OF ROCKFORD, AND HENRY T. SIDWAY, OF CHICAGO, ILLINOIS, ASSIGNORS TO HENRY T. SIDWAY & COMPANY, OF CHICAGO, ILLINOIS, A CORPORATION OF ILLINOIS.

HEATING APPLIANCE.

956,742.   Specification of Letters Patent.   Patented May 3, 1910.

Application filed November 23, 1908. Serial No. 464,034.

*To all whom it may concern:*

Be it known that we, CHARLES C. SPENGLER and HENRY T. SIDWAY, citizens of the United States, residing at Rockford, in the county of Winnebago and State of Illinois, and Chicago, in the county of Cook and State of Illinois, respectively, have invented certain new and useful Improvements in Heating Appliances, of which the following is a specification.

This invention relates to devices intended to be placed over the burner of a gas or similar stove, for the purpose of distributing the heat from said burner to a plurality of cooking utensils.

One of the objects of the invention is to provide means for preventing distortion of the appliance by the heat to which it is exposed.

A further object is to improve the construction of devices of this class with the view to increased efficiency, and simplicity and durability of construction.

In the accompanying drawing, Figure 1 is a top plan view of a heating appliance embodying the features of our invention. Fig. 2 is an underside view thereof. Fig. 3 is a sectional view taken upon the plane of line 3 3 of Fig. 1. Fig. 4 is a detail view of a handle for the implement. Fig. 5 is a section on line 5 5 of Fig. 1.

The embodiment of our invention which we have selected for illustration is adapted to distribute the heat from the burner to three cooking utensils, although it will be understood that this number may be varied. As herein shown the device is adapted to be placed on the top of a gas stove with its central portion over a burner, said device being adapted to support the kettles or other utensils to be heated.

Referring to the drawings, 1 indicates a bottom plate and 2 a top plate, said plates being substantially parallel with one another and being fixed together and spaced apart by suitable means, as, for example, rivets 3 and distance sleeves 4 surrounding said rivets. Extending between said plates is a vertical wall 5 of suitable construction, but preferably consisting of a strip of band iron held in place by the rivets 3 and 6 and its ends secured together by means of rivets 7. In the lower side of the bottom plate 1 and centrally thereof is an opening 8 through which the heated gases from the burner enter the space bounded by the plates 1 and 2 and the marginal wall 5. In the top plate 2 are three openings 9, over which cooking utensils, dishes to be warmed, etc., may be set. In order that said utensils shall not prevent a draft through the openings 8 and 9, raised portions 10 are provided adjacent to said openings upon which the cooking utensils may rest. To accommodate utensils of small diameter, one or more of the openings 9 may be provided with means such as lugs 11 struck up from plate 2 and extending inwardly from the margin of said openings.

In order to distribute the heat from the burner to the openings 9, we provide a conical deflector 12 attached to the underside of the top plate 2, and centrally thereof, by any suitable means such as the rivets 13, the conical end of said deflector extending downwardly. We have herein represented the deflector 12 as stamped from a single piece of sheet metal. In this instance the top plate 2 is formed of three substantially similar sections 2ª secured together by means of certain of the rivets 3 passing through the over-lapping edges 2ᵇ of said sections 2ª, the central portions of the adjacent edges of said sections being spaced apart to form slots 14 which provide for expansion caused by the heat to which the appliance is subjected in use. The adjacent central portions of the sections 2ª are connected together and to the deflector by means of a rivet 15 and a washer 16 under said rivet, and overlying said sections 2ª. The interior of the deflector 12 may be filled with suitable non-conducting material 17, as, for example, asbestos. The marginal wall 5 is bent inwardly between the openings 9 so as to cause the heated gases entering the opening 8 to pass directly to the openings 9.

In order that heat may be shut off from one of the openings 9, when desired, we provide a damper 18 pivotally mounted in the wall 5, and having a handle 19 extending through said wall, for operating the damper.

20 is a handle pivoted to the heating appliance for convenience in placing said appliance on a gas stove and removing it therefrom. Openings 21 may also be provided in the plate 2 for the reception of a stove lid lifter of common form, lugs 22 struck downwardly from said plate serving as a guide for said lifter, and preventing horizontal displacement of the appliance with relation to said lifter.

In use, the appliance is placed upon a gas stove, centrally over a burner, and cooking utensils set upon said appliance above the openings 9. The heated gases from the burner upon striking the conical deflector 12 are distributed to the openings 9. Said deflector in conjunction with the slotted construction of the top plate 2 prevents said top plate from being warped or otherwise injured by the heat from the burner. The insulation 17 is not essential.

We would have it understood that we desire not to be limited to the details of construction shown and described herein, as various modifications will occur to persons skilled in the art.

We claim as our invention:

1. A heating appliance comprising two plates and a wall extending between said plates adjacent to the margins thereof, said plates having openings therein, one of said plates being formed in sections, the central portions of adjacent edges of said sections being spaced apart.

2. A heating appliance comprising a hollow structure having openings therein, a heat-deflector in said structure, one wall of said structure being formed in sections, the central portions of adjacent edges of said sections being spaced apart, and a rivet connecting said central portions with the tip of said deflector.

3. An appliance adapted to be set loosely upon the top of a stove for distributing the heat from one burner of such stove to a plurality of cooking utensils placed on said appliance, said appliance consisting of two plates spaced apart and secured together in parallel relation, a marginal wall extending between said plates, the lower plate having an opening therein to register with a burner of a stove, and the upper plate having a plurality of openings therein, which latter openings are out of register with the opening in the lower plate, the upper plate being adapted to support utensils placed over the openings in said upper plate, and a deflector secured upon the under side of the upper plate directly above the opening in the lower plate and adjacent the inner edges of the openings in the upper plate, for directing the heated gases from the opening in the lower plate to the openings in the upper plate.

4. A relatively thin appliance adapted to be set loosely upon the top of a stove for distributing the heat from one burner of such stove to a plurality of cooking utensils placed on said appliance, said appliance consisting of two plates spaced apart, rivets securing said plates together in parallel relation, a narrow marginal wall extending between said plates, the lower plate having an opening therein to register with a burner of a stove, and the upper plate having a plurality of openings therein, which latter openings are out of register with the opening in the lower plate, said marginal wall being bent so as to cause the heated gases entering the lower opening to pass directly to the openings in the upper plate, said upper plate having raised portions surrounding the openings in the upper plate to space from said upper plate utensils placed over the openings in said upper plate, and a deflector secured upon the under side of the upper plate directly above the opening in the lower plate, for directing the heated gases from the opening in the lower plate to the openings in the upper plate.

CHARLES C. SPENGLER.
HENRY T. SIDWAY.

Witnesses:
LUTHER L. MILLER,
GEORGE L. CHINDAHL.